US012671849B2

(12) United States Patent
Sundaram et al.

(10) Patent No.:    US 12,671,849 B2
(45) Date of Patent:        Jun. 30, 2026

(54) COMPRESSION OF MULTIPLANE IMAGES

(71) Applicant: DOLBY LABORATORIES LICENSING CORPORATION

(72) Inventors: Vijay Sundaram, Sunnyvale, CA (US); Ajit Ninan, San Jose, CA (US)

(73) Assignee: DOLBY LABORATORIES LICENSING CORPORATION, San Francisco, CA (US)

(*) Notice:    Subject to any disclaimer, the term of this patent is extended or adjusted under 35 U.S.C. 154(b) by 125 days.

(21) Appl. No.: 18/805,864

(22) Filed:    Aug. 15, 2024

(65)            Prior Publication Data

US 2025/0063208 A1    Feb. 20, 2025

Related U.S. Application Data

(60) Provisional application No. 63/520,198, filed on Aug. 17, 2023.

(30)        Foreign Application Priority Data

Aug. 29, 2023    (EP) ..................................... 23194075

(51) Int. Cl.
H04N 19/85        (2014.01)
H04N 19/119       (2014.01)
        (Continued)
(52) U.S. Cl.
CPC ........... H04N 19/85 (2014.11); H04N 19/119 (2014.11); H04N 19/136 (2014.11);
        (Continued)

(58) Field of Classification Search
None
See application file for complete search history.

(56)            References Cited

U.S. PATENT DOCUMENTS

2004/0041820 A1    3/2004  Sevigny
2010/0209009 A1*   8/2010  Matsunaga .......... H04N 25/134
                                                382/224
                            (Continued)

OTHER PUBLICATIONS

Garus et al., "Decoder Side Multiplane Images using Geometry Assistance SEI for MPEG Immersive Video", 2022 IEEE 24th International Workshop on Multimedia Signal Processing (MMSP), Shanghai, China, 2022, 6 Pages.
                            (Continued)

*Primary Examiner* — Mohammad J Rahman

(57)            ABSTRACT

Methods and apparatus for compressing and decompressing MPI videos. According to an example embodiment, a method of compressing an MPI video includes splitting the MPI video into first and second frame sequences including texture and alpha frames of multiplane images, respectively. The method further includes applying sets of preprocessing operations to convert the first frame sequence into a third frame sequence and to convert the second frame sequence into a fourth frame sequence. Example preprocessing operations include, but are not limited to, applying a fill process, thresholding RGB channels based on the corresponding alpha channel, blurring images, computing pixelwise difference values of frames, and computing pixelwise product values of frames. The method also includes applying video compression to the second frame sequence and to the fourth frame sequence.

16 Claims, 11 Drawing Sheets

(51) Int. Cl.

| | |
|---|---|
| *H04N 19/136* | (2014.01) |
| *H04N 19/172* | (2014.01) |
| *H04N 19/182* | (2014.01) |
| *H04N 19/463* | (2014.01) |

(52) U.S. Cl.
CPC ......... *H04N 19/172* (2014.11); *H04N 19/182* (2014.11); *H04N 19/463* (2014.11)

(56) References Cited

U.S. PATENT DOCUMENTS

| | | | |
|---|---|---|---|
| 2016/0335792 A1 | 11/2016 | Forutanpour | |
| 2018/0322691 A1 | 11/2018 | Mitchell | |
| 2020/0226816 A1* | 7/2020 | Kar | G06T 7/50 |
| 2020/0228774 A1 | 7/2020 | Kar | |
| 2021/0295047 A1 | 9/2021 | Furlan | |
| 2021/0295152 A1* | 9/2021 | Bouman | G03H 1/0866 |
| 2021/0368157 A1 | 11/2021 | Overbeck | |
| 2022/0005164 A1 | 1/2022 | Rodriguez | |
| 2022/0303520 A1 | 9/2022 | Dahi | |

| | | | |
|---|---|---|---|
| 2023/0070459 A1* | 3/2023 | Prince | B01L 3/502784 |
| 2023/0362409 A1* | 11/2023 | Chupeau | H04N 19/70 |
| 2025/0139746 A1* | 5/2025 | Jenoski | G06T 5/50 |

OTHER PUBLICATIONS

Garus, Patrick, "Compression and synthesis for representation of immersive content adapted to 6 DoF", Image Processing [eess.IV]. Université Rennes 1, 2022, 217 Pages.

Oh et al., "View Synthesis Distortion Estimation for AVC- and HEVC-Compatible 3-D Video Coding", IEEE Transactions on Circuits and Systems for Video Technology, vol. 24, No. 6, Jun. 2014, 10 Pages.

Tech et al., "Overview of the Multiview and 3D Extensions of High Efficiency Video Coding", IEEE Transactions on Circuits and Systems for Video Technology, vol. 26, No. 1, Jan. 2016, 15 Pages.

Vadakital et al., "The MPEG Immersive Video Standard—Current Status and Future Outlook", IEEE MultiMedia, vol. 29, No. 3, Jul. 1-Sep. 2022, 11 Pages.

* cited by examiner $700_{20}$ $700_{17}$ $700_{12}$ $800_{20}$ $800_{17}$ $800_{12}$ $900_{20}$ $900_{17}$ $900_{12}$

COMPRESSION OF MULTIPLANE IMAGES

CROSS-REFERENCE TO RELATED APPLICATIONS

This application claims priority to European Patent Application No. 23194075.0, filed on 29 Aug. 2023 and U.S. provisional application 63/520,198, filed on 17 Aug. 2023, all of which are incorporated herein by reference in their entirety.

FIELD OF THE DISCLOSURE

Various example embodiments relate generally to multiplane imaging (MPI) and, more specifically but not exclusively, to compression of multiplane images for storage and/or transmission.

BACKGROUND

Image compression is a process applied to an image file with the purpose of reducing the file size in bytes without degrading the image quality to a level below a selected quality threshold. By reducing the file size, more images can be stored in a given memory volume. The compressed images also take less bandwidth to transmit over a communication channel, thereby beneficially reducing network congestion and speeding up content delivery.

Multiplane images embody a relatively new approach to storing volumetric content. MPI can be used to render both still images and video and represents a three-dimensional (3D) scene within a view frustum using, e.g., 8, 16, or 32 planes of texture and transparency (alpha) information per camera. Example applications of MPI include computer vision and graphics, image editing, photo animation, robotics, and virtual reality.

BRIEF SUMMARY OF SOME SPECIFIC EMBODIMENTS

Disclosed herein are various embodiments of encoders and decoders for compression and decompression of MPI videos. One embodiment provides an MPI video encoder configured to use a conventional video-compression codec, such as a High Efficiency Video Coding (HEVC) codec or an MPEG-4 Advanced Video Coding (AVC) codec, and further configured to apply to texture and alpha sublayers of multiplane images various sets of preprocessing operations directed at improving compressibility of frame sequences representing an MPI video. Example preprocessing operations include, but are not limited to, applying a fill process, thresholding RGB channels based on the corresponding alpha channel, blurring images, computing pixelwise difference values of frames, and computing pixelwise product values of frames. Another embodiment provides a compatible MPI video decoder.

According to an example embodiment, provided is a method of compressing an MPI video, the method comprising: splitting the MPI video into a first frame sequence and a second frame sequence, the first frame sequence being a sequence of texture frames, with each of the texture frames representing a respective layer of a corresponding multiplane image of the MPI video, the second frame sequence being a sequence of alpha frames, with each of the alpha frames corresponding to a respective one of the texture frames of the first sequence; applying a first set of preprocessing operations to convert the first frame sequence into a third frame sequence, the first set including operations according to which a pixel value in a frame of the third frame sequence is determined based on a comparison of a corresponding pixel value of the corresponding alpha frame of the second frame sequence with a first threshold value; applying a second set of preprocessing operations to convert the second frame sequence into a fourth frame sequence, the second set including operations according to which a pixel value in a frame of the fourth frame sequence is determined based on a comparison of a corresponding pixel value of a corresponding source image with a second threshold value; and applying video compression to the second frame sequence and to the fourth frame sequence.

According to another example embodiment, provided is an apparatus for compressing an MPI video, the apparatus comprising: at least one processor; and at least one memory including program code, wherein the at least one memory and the program code are configured to, with the at least one processor, cause the apparatus at least to: split the MPI video into a first frame sequence and a second frame sequence, the first frame sequence being a sequence of texture frames, with each of the texture frames representing a respective layer of a corresponding multiplane image of the MPI video, the second frame sequence being a sequence of alpha frames, with each of the alpha frames corresponding to a respective one of the texture frames of the first sequence; apply a first set of preprocessing operations to convert the first frame sequence into a third frame sequence, the first set including operations according to which a pixel value in a frame of the third frame sequence is determined based on a comparison of a corresponding pixel value of the corresponding alpha frame of the second frame sequence with a first threshold value; apply a second set of preprocessing operations to convert the second frame sequence into a fourth frame sequence, the second set including operations according to which a pixel value in a frame of the fourth frame sequence is determined based on a comparison of a corresponding pixel value of a corresponding source image with a second threshold value; and apply video compression to the second frame sequence and to the fourth frame sequence.

According to yet another example embodiment, provided is a method of rendering an MPI video, the method comprising: receiving (i) a first compressed frame sequence having encoded therein a sequence of texture frames, with each of the texture frames representing a respective layer of a corresponding multiplane image of the MPI video, (ii) a second compressed frame sequence having encoded therein a sequence of alpha frames, with each of the alpha frames corresponding to a respective one of the texture frames, and (iii) a compressed sequence of source images; applying video decompression to the first compressed frame sequence, the second compressed frame sequence, and the compressed sequence of source images to generate a first uncompressed frame sequence, a second uncompressed frame sequence, and an uncompressed sequence of source images; applying a first set of postprocessing operations to the first uncompressed frame sequence to recover the sequence of texture frames; applying a second set of postprocessing operations to the second uncompressed frame sequence to recover the sequence of alpha frames; and combining corresponding pairs of frames from the recovered sequence of texture frames and the recovered sequence of alpha frames to generate a sequence of four-channel frames, with each of the four-channel frames representing a respective layer of a corresponding multiplane image of the MPI video, wherein at least one of the first set of postprocessing operations and the second set of postprocessing operations includes one or more operations using the uncompressed sequence of source images.

According to yet another example embodiment, provided is an apparatus for rendering an MPI video, the apparatus comprising: at least one processor; and at least one memory including program code, wherein the at least one memory and the program code are configured to, with the at least one processor, cause the apparatus at least to: receive (i) a first compressed frame sequence having encoded therein a sequence of texture frames, with each of the texture frames representing a respective layer of a corresponding multiplane image of the MPI video, (ii) a second compressed frame sequence having encoded therein a sequence of alpha frames, with each of the alpha frames corresponding to a respective one of the texture frames, and (iii) a compressed sequence of source images; apply video decompression to the first compressed frame sequence, the second compressed frame sequence, and the compressed sequence of source images to generate a first uncompressed frame sequence, a second uncompressed frame sequence, and an uncompressed sequence of source images; apply a first set of postprocessing operations to the first uncompressed frame sequence to recover the sequence of texture frames; apply a second set of postprocessing operations to the second uncompressed frame sequence to recover the sequence of alpha frames; and combine corresponding pairs of frames from the recovered sequence of texture frames and the recovered sequence of alpha frames to generate a sequence of four-channel frames, with each of the four-channel frames representing a respective layer of a corresponding multiplane image of the MPI video, wherein at least one of the first set of postprocessing operations and the second set of postprocessing operations includes one or more operations using the uncompressed sequence of source images.

BRIEF DESCRIPTION OF THE DRAWINGS

Other aspects, features, and benefits of various disclosed embodiments will become more fully apparent, by way of example, from the following detailed description and the accompanying drawings, in which.

DETAILED DESCRIPTION

This disclosure and aspects thereof can be embodied in various forms, including hardware, devices or circuits controlled by computer-implemented methods, computer program products, computer systems and networks, user interfaces, and application programming interfaces; as well as hardware-implemented methods, signal processing circuits, memory arrays, application specific integrated circuits (ASICs), field programmable gate arrays (FPGAs), and the like. The foregoing is intended solely to give a general idea of various aspects of the present disclosure and does not limit the scope of the disclosure in any way.

In the following description, numerous details are set forth, such as optical device configurations, timings, operations, and the like, in order to provide an understanding of one or more aspects of the present disclosure. It will be readily apparent to one skilled in the art that these specific details are merely exemplary and not intended to limit the scope of this application.

Various methods used to compress images typically fall into one of two categories: lossy compression and lossless compression. Lossy compression reduces the image file size by permanently removing some information, which becomes irreversibly lost. A representative example of lossy compression is the JPEG format used extensively on the web and in digital photography. Lossless compression reduces the image file size without removing critical data and results in a compressed image that can be restored to its original state with no degradation or distortion. However, lossless compression does not typically reduce the file size as much as lossy compression. As a result, lossless compression is typically used in situations where image quality is more important than disk space or network performance, such as for product images or showcasing artwork.

Example Video/Image Delivery Pipeline

Figure 1:
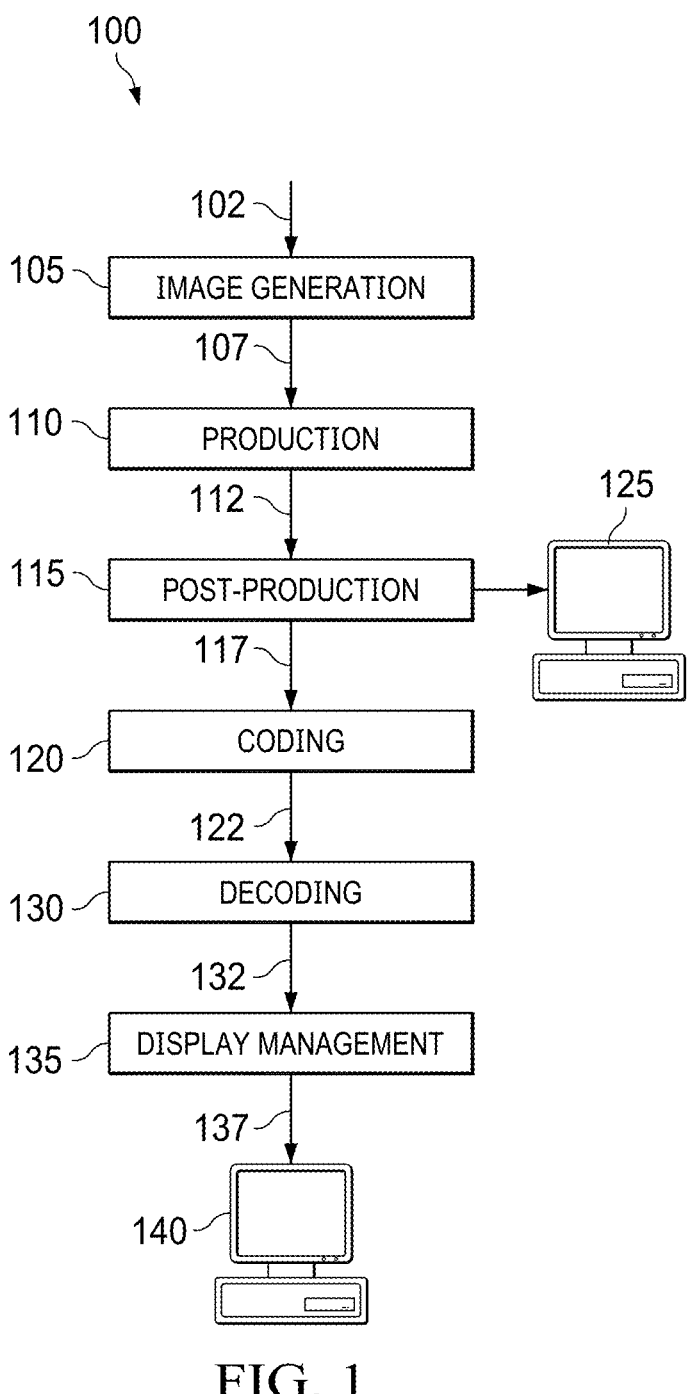
FIG. 1 depicts an example process for a video/image delivery pipeline.

FIG. 1 depicts an example process of a video delivery pipeline (100), showing various stages from video/image capture to video/image-content display according to an embodiment. A sequence of video/image frames (102) may be captured or generated using an image-generation block (105). The frames (102) may be digitally captured (e.g., by a digital camera) or generated by a computer (e.g., using computer animation) to provide video and/or image data (107). Alternatively, the frames (102) may be captured on film by a film camera. Then, the film may be translated into a digital format to provide the video/image data (107). In some examples, the image-generation block (105) includes generating an MPI image or video.

In a production phase (110), the data (107) may be edited to provide a video/image production stream (112). The data of the video/image production stream (112) may be provided to a processor (or one or more processors, such as a central processing unit, CPU) at a post-production block (115) for post-production editing. The post-production editing of the block (115) may include, e.g., adjusting or modifying colors or brightness in particular areas of an image to enhance the image quality or achieve a particular appearance for the image in accordance with the video creator's creative intent. This part of post-production editing is sometimes referred to as "color timing" or "color grading." Other editing (e.g., scene selection and sequencing, image cropping, addition of computer-generated visual special effects, removal of artifacts, etc.) may be performed at the block (115) to yield a "final" version (117) of the production for distribution. In some examples, operations performed at the block (115) include enhancing texture and/or alpha channels in multiplane images/video. During the post-production editing (115), video and/or images may be viewed on a reference display (125).

Following the post-production (115), the data of the final version (117) may be delivered to a coding block (120) for being further delivered downstream to decoding and playback devices, such as television sets, set-top boxes, movie theaters, and the like. In some embodiments, the coding block (120) may include audio and video encoders, such as those defined by the ATSC, DVB, DVD, Blu-Ray, and other delivery formats, to generate a coded bitstream (122). In a receiver, the coded bitstream (122) is decoded by a decoding unit (130) to generate a corresponding decoded signal (132) representing a copy or a close approximation of the signal (117). The receiver may be attached to a target display (140) that may have somewhat or completely different characteristics than the reference display (125). In such cases, a display management (DM) block (135) may be used to map the decoded signal (132) to the characteristics of the target display (140) by generating a display-mapped signal (137). Depending on the embodiment, the decoding unit (130) and display management block (135) may include individual processors or may be based on a single integrated processing unit.

A codec used in the coding block (120) and/or the decoding block (130) enables video/image data processing and compression/decompression. The compression is used in the coding block (120) to make the corresponding file(s) or stream(s) smaller. The decoding process carried out by the decoding block (130) typically includes decompressing the received video/image data file(s) or streams(s) into a form usable for playback and/or further editing. Example coding/decoding operations that can be used in the coding block (120) and the decoding unit (130) according to various embodiments are described in more details below.

Multiplane Imaging

A multiplane image comprises multiple image planes, with each of the image planes being a "snapshot" of the 3D scene at a certain depth with respect to the camera position. Information stored in each plane includes the texture information (e.g., represented by the R, G, B values) and transparency information (e.g., represented by the alpha (A) values). Herein, the acronyms R, G, B stand for red, green, and blue, respectively. In some examples, the three texture components can be (Y, Cb, Cr), or (I, Ct, Cp), or another functionally similar set of values. There are different ways in which a multiplane image can be generated. For example, two or more input images from two or more cameras located at different known viewpoints can be co-processed to generate a corresponding multiplane image. Alternatively, a multiplane image can be generated using a source image captured by a single camera.

Figure 2:
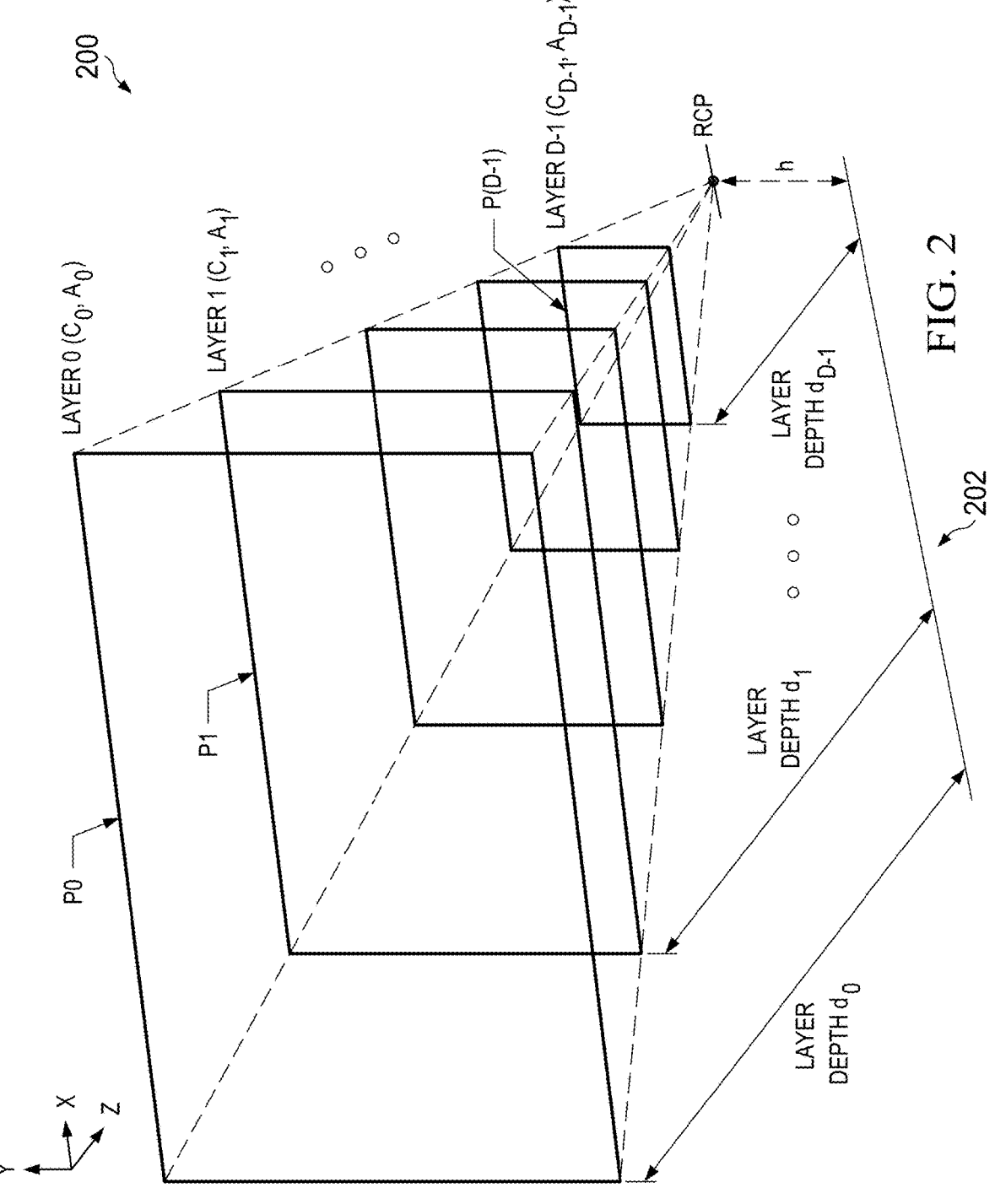
FIG. 2 pictorially illustrates a 3D-scene representation using a multiplane image according to an embodiment.

FIG. 2 pictorially illustrates a 3D scene representation using a multiplane image (200) according to an embodiment. The multiplane image (200) has D planes or layers (P0, P1, . . . , P(D–1)), where D is an integer greater than one. Typically, the planes (layers) are indexed such that the most remote layer, from the reference camera position (RCP), is indexed as the 0-th layer and is at a distance (or depth) $d_0$ from the RCP along the Z dimension of the 3D scene. The index is incremented by one for each next layer located closer to the RCP. The plane (layer) that is the closest to the RCP has the index value (D–1) and is at a distance (or depth) $d_{D-1}$ from the RCP along the Z dimension. Each of the planes (P0, P1, . . . , P(D–1)) is orthogonal to a base plane (202) which is parallel to the XZ-coordinate plane. The RCP is at a vertical height h above the base plane (202). The XYZ triad shown in FIG. 2 indicates the general orientation of the multiplane image (200) and the planes (P0, P1, . . . , P(D–1)) with respect to the X, Y, and Z dimensions of the 3D scene. In various examples, the number D can be 32, 16, 8, or any other suitable integer greater than one.

Let us denote the color component (e.g., RGB) value for the $i^{th}$ layer at camera location s as $$C_i^{(s)},$$

with the lateral size of the layer being H×W, where H is the height (Y dimension) and W is the width (X dimension) of the layer. The pixel value at location (x, y) for the color channel c is represented as $$C_i^{(s)}(x, y, c).$$

The α value for the $i^{th}$ layer is $$A_i^{(s)}.$$

The pixel value (x, y) in the alpha layer is represented as $$A_i^{(s)}(x, y).$$

The depth distance between the $i^{th}$ layer to the reference camera position is $d_i$. The image from the original reference view (without the camera moving) is denoted as R, with the texture pixel value being $R^{(s)}(x, y, c)$. A still MPI image for the camera location s can therefore be represented as:

$$MPI(s) = \{C_i^{(s)}(x, y, c), A_i^{(s)}(x, y)\}, i = 0, \dots, D-1 \qquad (1)$$

It is straightforward to extend this still MPI image representation to a video representation, provided that the camera position s is kept static overtime. This video representation is given by Eq. (2):

$$MPI(s, t) = \{C_i^{(s)}(x, y, c, t), A_i^{(s)}(x, y, t)\}, i = 0, \dots, D-1 \qquad (2)$$

where t denotes time.

As already indicated above, a multiplane image, such as the multiplane image (200), can be generated from a single source image R or from two or more source images. Such generation may be performed, e.g., during the production phase (110). The corresponding MPI generation algorithm (s) may typically output the multiplane image (200) containing XYZ-resolved pixel values in the form $\{(C_i, A_i)$ for i=0, . . . , D–1}.

By processing the multiplane image (200) represented by $\{(C_i, A_i)$ for i=0, ..., D−1$\}$, an MPI-rendering algorithm can generate a viewable image corresponding to the RCP or to a new virtual camera position that is different from the RCP. An example MPI-rendering algorithm (often referred to as the "MPI viewer") that can be used for this purpose may include the steps of warping and compositing. Other suitable MPI viewers may also be used. The rendered multiplane image (200) can be viewed, e.g., on the reference display (125).

During the warping step of the MPI-rendering algorithm, each layer ($C_i$, $A_i$) of the multiplane image (200) may be warped from the RCP viewpoint position ($v_s$) to a new viewpoint position ($v_t$), e.g., as follows:

$$C_i^t = T_{v_s, v_t}(\sigma d_i, C_i) \tag{3}$$

$$A_i^t = T_{v_s, v_t}(\sigma d_i, A_i) \tag{4}$$

where $T_{v_s, v_t}( \ )$ is the warping function; and $\sigma$ is the consistent scale (to minimize error). In an example embodiment, the warping function $T_{v_s, v_t}( \ )$ can be expressed as follows:

$$\begin{bmatrix} u_s \\ v_s \\ 1 \end{bmatrix} = K_s\left(R - \frac{tn^T}{a}\right)(K_t)^{-1}\begin{bmatrix} u_t \\ v_t \\ 1 \end{bmatrix} \tag{5}$$

where $v_s=(u_s, v_s)$ and $v_t=(u_t, v_t)$. Through (5), each pixel location ($u_t$, $v_t$) on the target view of a certain MPI plane can be mapped to its respective pixel location ($u_s$, $v_s$) on the source view. The functions $K_s$ and $K_t$ represent the intrinsic camera model for the reference view and the target view, respectively. The functions R and t represent the extrinsic camera model for rotation and translation, respectively. n denotes the normal vector $[0\ 0\ 1]^T$. $\alpha$ denotes the distance to a plane that is fronto-parallel to the source camera at depth $\sigma d_i$.

During the compositing step of the MPI-rendering algorithm, a new viewable image $C^t$ can be generated, e.g., using processing operations corresponding to the following equations:

$$C^t = \sum_{i=0}^{D-1} C_i^t W_i^t \tag{6}$$

where the weights $$W_i^t$$

are expressed as:

$$W_i^t = \left(A_i^t \cdot \prod_{j=i+1}^{D-1}(1 - A_j^t)\right) \tag{7}$$

The disparity map $D^s$ corresponding to the source view can be computed as:

$$D^s = \sum_{i=0}^{D-1} d_i^{-1} W_i^s \tag{8}$$

where the weights $$W_i^s$$

are expressed as:

$$W_i^s = A_i \cdot \prod_{j=i+1}^{D-1}(1 - A_j)) \tag{9}$$

The MPI-rendering algorithm can also be used to generate the viewable image $C^s$ corresponding to the RCP. In this case, the warping step is omitted, and the image $C^s$ is computed as:

$$C^s = \sum_{i=0}^{D-1} C_i^s W_i^s \tag{10}$$

In the single camera transmission scenario, only one MPI is fed through a bitstream. A goal for this situation is to optimally merge the layers of the original MPI such that the quality of this MPI after local warping is preserved. In the multiple camera transmission scenario, multiple MPIs captured in different camera positions are encoded in the compressed bitstream. The information in these MPIs is jointly used to generate global novel views for positions located between the original camera positions. There also can be a scenario where information from multiple cameras can be used jointly to generate a single MPI to be transmitted. For transmissions of MPI video, the multiple camera transmission scenario is typically used, e.g., as explained below.

Figure 3:
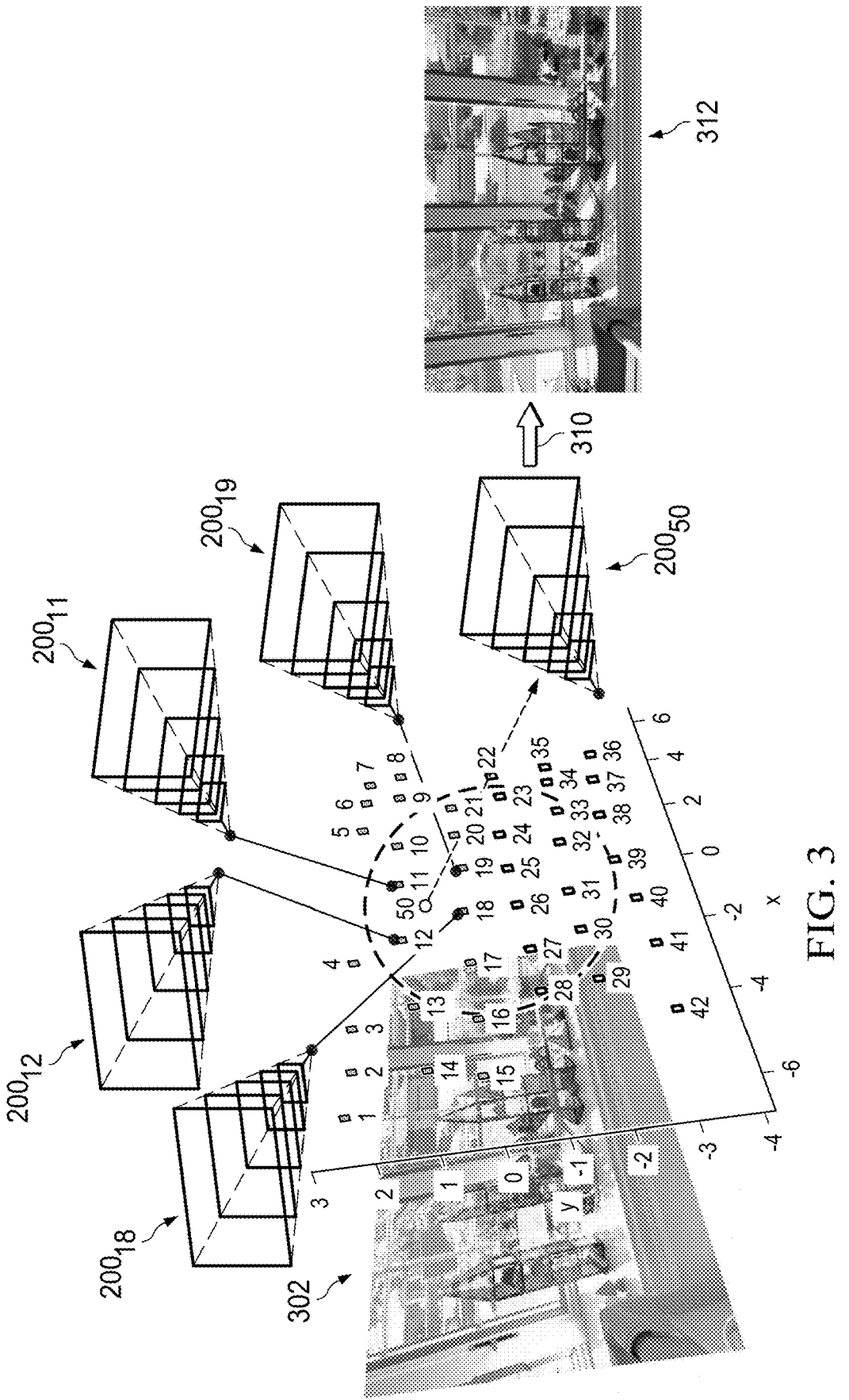
FIG. 3 pictorially illustrates a process of generating a novel view of a 3D scene according to one example.

FIG. 3 pictorially illustrates a process of generating a novel view of a 3D scene (302) according to one example. In the example shown, the 3D scene (302) is captured using forty-two RCPs (1, 2, ..., 42). The novel view that is being generated corresponds to a camera position (50). The four closest RCPs to the camera position (50) are the RCPs (11, 12, 18, 19). The corresponding multiplane images are multiplane images (200₁₁, 200₁₂, 200₁₈, 200₁₉). A multiplane image (200₅₀) corresponding to the camera position (50) is generated by correspondingly warping the multiplane images (200₁₁, 200₁₂, 200₁₈, 200₁₉) and then merging the resulting warped multiplane images. Finally, a viewable image (312) of the 3D scene (302) is generated by applying the compositing step (310) of the MPI-rendering algorithm to the multiplane image (200₅₀).

In general, a 3D scene, such as the 3D scene (302) may be captured using any suitably selected number of RCPs. The locations of such RCPs can also be variously selected, e.g., based on the creative intent. In typical practical examples, when a novel view, such as the viewable image (312) is rendered, only several neighboring RCPs are used for the rendering. Hereafter, such neighboring views are referred to as the "active views." In the example illustrated in FIG. 3, the number of active views is four. In other examples, a different (from four) number of active views may similarly be used. As such, the number of active views is a selectable parameter. For illustration purposes and without any implied limitations, some example embodiments are described herein below in reference to four active views. In some examples, the set of active views may change over time when the camera position (50) moves. In some examples, the number of active views may change over time when the camera position (50) moves.

Figure 4:
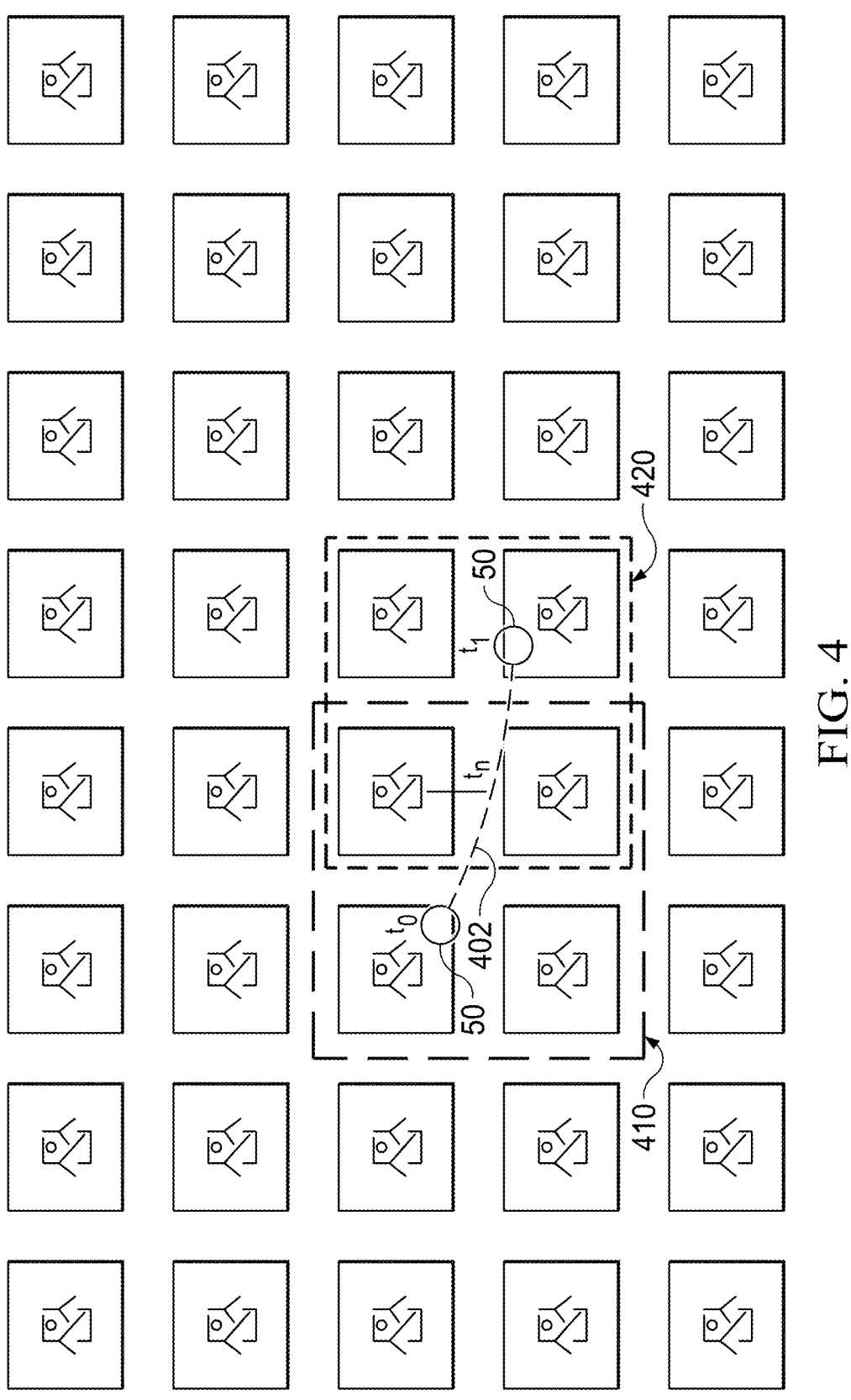
FIG. 4 is a block diagram illustrating a change of the set of active views over time according to one example.

FIG. 4 is a block diagram illustrating a change of the set of active views over time according to one example. In the example shown, a 3D scene is captured using a rectangular array of forty RCPs arranged in five rows and eight columns. A dashed arrow (402) represents a movement trajectory of the novel camera position (50) during the time interval starting at the time $t_0$ and ending at the time $t_1$ for virtual view synthesis. At the time $t_0$, the set of active views includes the four views encompassed by the dashed box (410). At the time $t_1$, the set of active views includes the four views encompassed by the dotted box (420). At the time $t_n$ (where $t_0 < t_n < t_1$), the set of active views changes from being the set in the dashed box (410) to being the set in the dotted box (420).

As an example, let us consider a 3D scene (302) having a field of view with sizes of 1 m in the X direction and 0.5 m in the Y direction that is captured using fifty RCPs, e.g., arranged in a 10×5 array similar to the array illustrated in FIG. 4. With the resolution of 1080×1080 pixels², a 32-plane MPI representation generates approximately 7.12 GB of data (=1080×1080×4 (channels)×32 (planes)×50 (poses) =7119 MB). Note that this amount of data corresponds to a single time instant, captured across different camera positions. Since an MPI video represents multiple time instances, the corresponding amount of data increases accordingly. As a result, substantial compression needs to be applied to the MPI data to make the use of MPI video viable for at least some applications.

For a more complex 3D scene (302), there might be a need for a higher number D of planes (which helps to reduce an error associated with insufficient depth quantization) for a more-accurate visual representation of novel views from the MPI. In such cases, even larger amounts of data need to be sent through the transmission channel than in the above-described examples. Accordingly, the need for MPI-data compression in such cases becomes even more evident.

At least some of the above-indicated problems in the state of the art can beneficially be addressed using various embodiments disclosed herein. For example, one embodiment focuses on the use of conventional video-compression codecs, such as AVC/HEVC. Accordingly, in various examples, a corresponding video encoder can be a High Efficiency Video Coding (HEVC) encoder, an MPEG-4 Advanced Video Coding (AVC) encoder, or any other suitable existing video encoder. Beneficially, the ready availability of an ecosystem wherein many such encoders and decoders are available in playback devices already deployed to date allows the disclosed and functionally similar embodiments to be deployable immediately. In some embodiments, the disclosed compression methods can be appropriately modified and/or extended to support MPI representations incorporating multiple views in a single MPI stack.

For illustration purposes, we assume M RCPs and N depth layers in the MPI stack in each camera view. This MPI configuration produces N RGB textures indicating the color information at each pixel and N alpha layers representing opacity for every pixel of the corresponding MPI planes of a multiplane image (200). In the description that follows, the following notation is used:

Source Camera Captures (images) for M camera positions are denoted as $$S(m)(m \to 0 \text{ to } M-1) \tag{11}$$

MPI layers for M-camera positions, with N layers each, are denoted as $$RGB(m, n), \ \& \ A(m, n), \text{ where } (m \to 0 \text{ to } (M-1), n \to 0 \text{ to } (N-1)) \tag{12}$$

Since an MPI layer has four (R, G, B, A) channels with associated transparency data for each pixel, one can split the corresponding data into RGB texture frames and alpha (A) frames and compress those frames separately to generate different respective compressed bitstreams.

Encoding and Decoding MPI Videos

Figure 5:
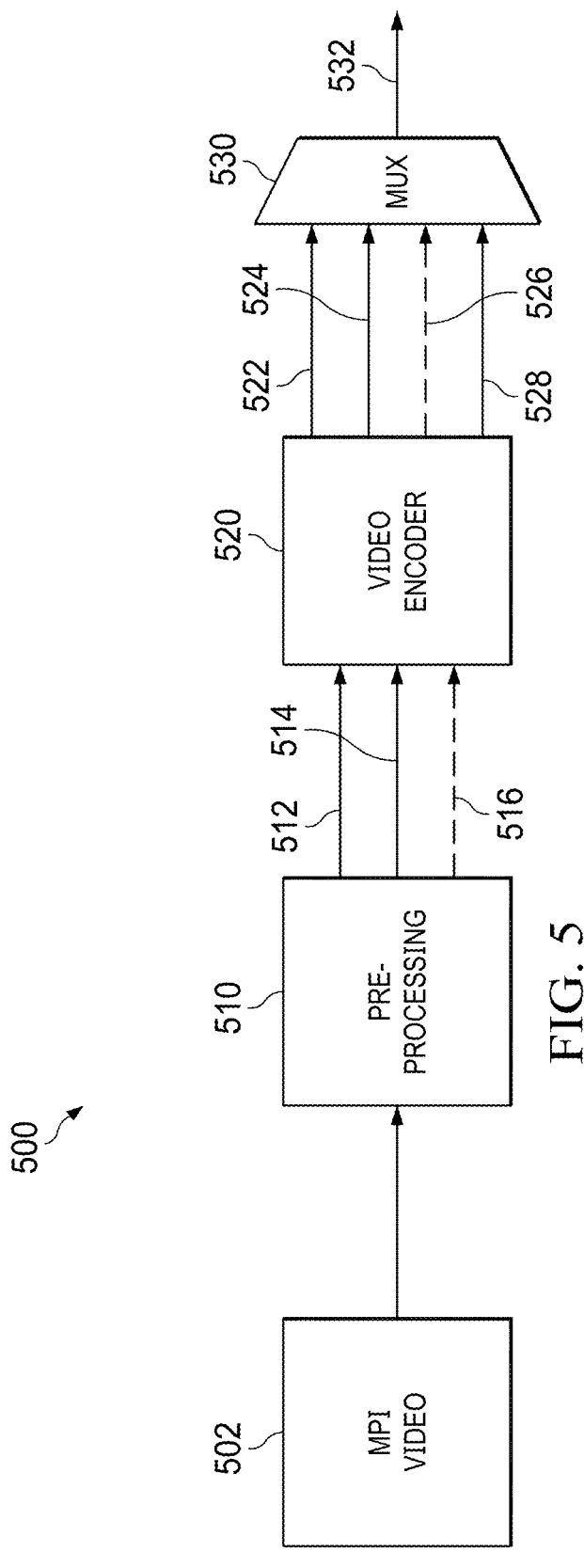
FIG. 5 is a block diagram illustrating an MPI encoder that can be used in the delivery pipeline of FIG. 1 according to an embodiment.

FIG. 5 is a block diagram illustrating an MPI encoder (500) according to an embodiment. In operation, the MPI encoder (500) transforms an MPI video (502) into a coded bitstream (532). The MPI video (502) includes a sequence of multiplane images (200) corresponding to a sequence of times. In various examples, the MPI video (502) corresponds to a single view or has two or more components corresponding to multiple views (also see FIGS. 3-4). In some examples, the MPI video (502) is conveyed via the video/image stream (112) or (117). The coded bitstream (532) is transmitted to the corresponding MPI decoder via the coded bitstream (122).

The MPI video (502) undergoes preprocessing in a preprocessing block (510) of the MPI encoder (500), which results in preprocessed video streams (512, 514, 516). In one example, preprocessing operations performed in the preprocessing block (510) include: (i) splitting each layer of a multiplane image (200) into a respective RGB texture frame and a respective alpha frame; (ii) applying a first set of preprocessing operations to a resulting stream of RGB texture frames to generate a preprocessed texture-frame stream (512); (iii) applying a second set of preprocessing operations to a resulting stream of alpha frames to generate a preprocessed alpha-frame stream (514); and (iv) optionally, generating a source video stream (516) carrying 2D image frames representing the view from the corresponding RCP. In some embodiments, the source video stream (516) is absent. Each of the video streams (512, 514, 516) has a format compatible with a video encoder (520). In some examples, additional preprocessing operations performed in the preprocessing block (510) may include, but are not limited to, normalization, reshaping, padding, scaling, and refinement applied to at least one of a texture channel and an alpha channel. Representative examples of such additional preprocessing operations that can be implemented in the preprocessing block (510) are described, e.g., in U.S. Provisional Patent Application No. 63/357,669, filed on Jul. 1, 2022, which is incorporated herein by reference in its entirety.

The video encoder (520) operates to covert each of the video streams (512, 514, 516), e.g., by applying suitable video compression thereto, into a corresponding one of compressed video streams (522, 524, 526). The video encoder (520) further operates to generate a corresponding video metadata stream (528). In various examples, the video encoder (520) can be an HEVC encoder, an MPEG-4 AVC encoder, or any other suitable video encoder. A multiplexer (MUX) (530) operates to generate the coded bitstream (532) by suitably multiplexing the bitstreams (522, 524, 526, 528).

Figure 6:
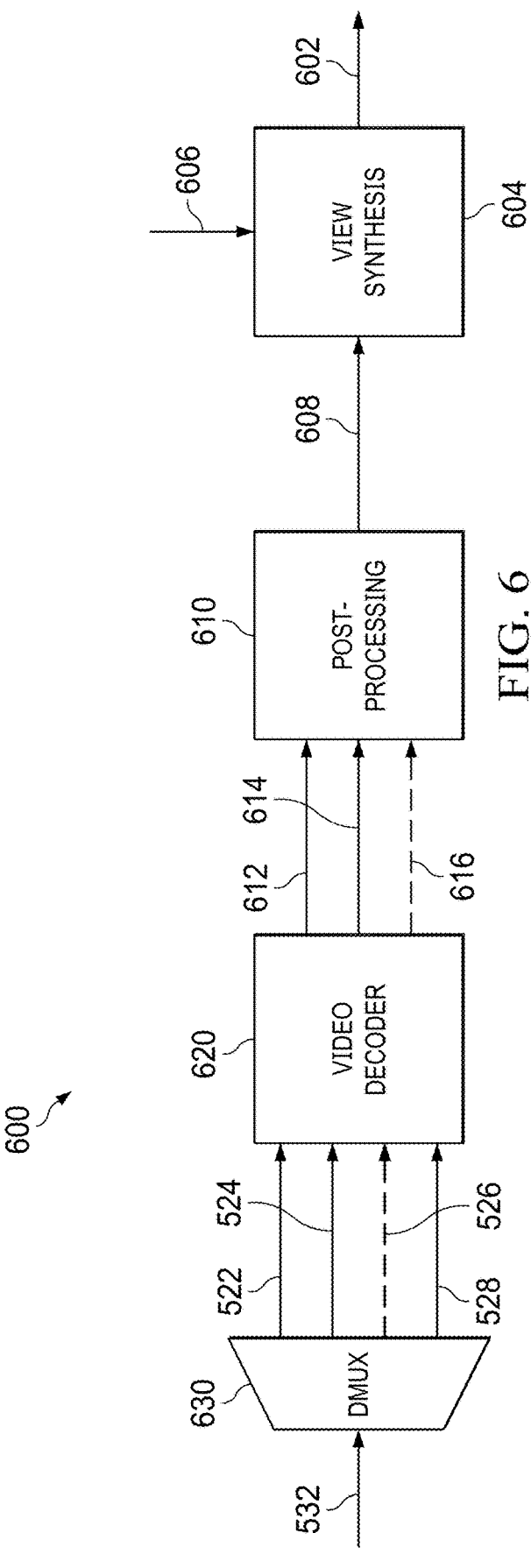
FIG. 6 is a block diagram illustrating an MPI decoder that can be used in the delivery pipeline of FIG. 1 according to an embodiment.

FIG. 6 is a block diagram illustrating an MPI decoder (600) according to an embodiment. The MPI decoder (600) is designed to be compatible with the corresponding MPI encoder (500). In operation, the MPI decoder (600) receives the coded bitstream (532) generated by the corresponding MPI encoder (500) as an input and generates an MPI video (602) corresponding to a camera position (606) as an output. In a representative example, the camera position (606) is specified to the MPI decoder (600) by the viewer and can be the same as one of the RCPs (also see FIG. 3) or be different from any of the RCPs. In some examples, the camera position (606) can be a function of time (also see FIG. 4).

In operation, a demultiplexer (DMUX) (630) of the MPI decoder (600) demultiplexes the received coded bitstream (532) to recover the bitstreams (522, 524, 526, 528). A video decoder (620) of the MPI decoder (600) is compatible with the video encoder (520) of the MPI encoder (500) and operates to decompress the video bitstreams (522, 524, 526) using the video metadata stream (528), thereby generating video bitstreams (612, 614, 616). When lossy compression is used, one or more of the bitstreams (612, 614, 616) is not an exact copy of the corresponding one of the bitstreams (512, 514, 516) but rather is a relatively close approximation thereof. When lossless compression is used, each of the bitstreams (612, 614, 616) is a copy of the corresponding one of the bitstreams (512, 514, 516). In either case, the bitstreams (612, 614, 616) lend themselves to postprocessing operations performed in a postprocessing block (610) of the MPI decoder (600). An output of the post-processing block (610) is an MPI video stream (608). Based on the camera position (606), a synthesis block (604) renders the MPI video stream (608) to generate a viewable video (602) corresponding to the camera position (606). In various examples, the rendering operations performed in the synthesis block (604) include some or all of the following: warping multiplane images (200) corresponding to one or more of the active RCPs, merging warped multiplane images, and compositing the pertinent sequence of MPI images to generate the viewable video (602).

Example MPI Video Coding Solutions

Figure 7C:
FIGS. 7A-7C pictorially illustrate several texture frames generated in a preprocessing block of the MPI encoder of FIG. 5 according to one example.
Figure 7C:
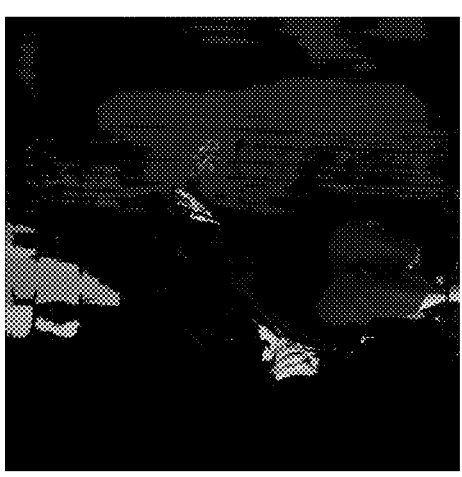
Figure 7B:
Figure 7A:
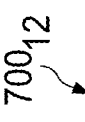
Figure 7A:
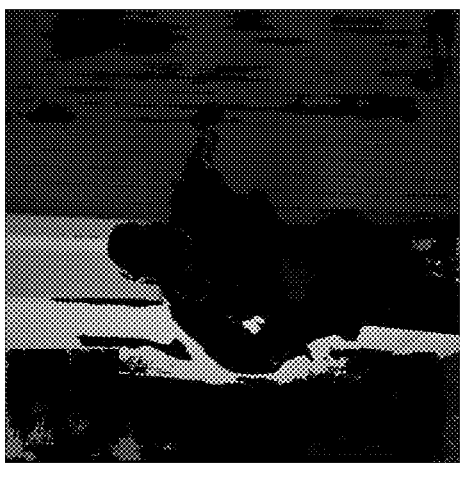

FIGS. 7A-7C pictorially illustrate several RGB texture frames generated in the preprocessing block (510) of the MPI encoder (500) according to one example. The corresponding multiplane image (200) is an image of a female violinist playing her violin while being seated on a stool in a house porch. The shown RGB texture frames, labeled ($700_{12}$, $700_{17}$, $700_{20}$), correspond to the 12-th, 17-th, and 20-th layers, respectively, of the corresponding multiplane image (200) and are produced by applying alpha-thresholding operations to the corresponding "raw" frames of that multiplane image (200). Such thresholding operations are typically used in a process of compressing MPI textures through a block-based video codec, such as an HEVC codec. Note that each of the texture frames ($700_{12}$, $700_{17}$, $700_{20}$) has a different respective set of substantially arbitrarily shaped edges evident from the example shown in FIGS. 7A-7C. When a texture frame having such edges is compressed through a block-based video codec, the corresponding compressed bitstream carries a significant number of bits that encode those edges. Through experimentations and simulations, the inventor(s) determined that transmission of those bits does not contribute in a meaningful way to the quality of the corresponding reconstructed MPI image for the decoded MPI video (602) while disadvantageously reducing the effective compression ratio, i.e., the ratio between the uncompressed size and the corresponding compressed size of the frame.

According to one embodiment, the preprocessing block (510) is configured to substantially eliminate the intra-image edges illustrated in FIGS. 7A-7C by applying to the RGB texture frames, such as the frames ($700_{12}$, $700_{17}$, $700_{20}$), a texture-fill operation described in more detail below. The texture-fill operation substantially removes such intra-image edges by filling some regions of the texture frame with the source image data extracted from the corresponding portions of the source video frame, thereby providing substantial continuity and/or completeness to the different texture layers. In some examples, a corresponding texture-fill operation includes using the alpha frame for the layer to perform an incorporation ("fill") of the source pixel values into the RGB texture at locations where alpha values are smaller than a selected fixed threshold value. In some examples, the texture-fill operation also includes applying a Gaussian blur operation to the pixel values of the source image frame to reduce high-frequency content therein and then using the resulting blurred source pixel values for the actual fill of the pertinent regions of RGB texture frame.

Example corresponding mathematical equations that can be used to implement the above-described fill operations in the preprocessing block (510) of the MPI encoder (500) are as follows:

$$BlurS(i, j) = GaussianBlur(S(i, j), 5 \times 5) \qquad (13)$$

$$Color(i, j) = \begin{cases} BlurS(i, j), & A(i, j) <= \text{alpha\_threshold} \\ RGB(i, j), & A(i, j) > \text{alpha\_threshold} \end{cases} \qquad (14)$$

where Eq. (13) defines a Gaussian blur operation with a (5×5) pixel kernel; and Eq. (14) defines the fill operation. According to the fill operation of Eq. (14), an RGB texture frame for the video bitstream (512) is generated by: (i) using the actual RGB pixel value of the corresponding MPI layer when the alpha value for that pixel is greater than the fixed threshold value (alpha_threshold); and (ii) using the Gaussian-blurred RGB source pixel value when the alpha value for that pixel is smaller than or equal to the fixed threshold value. In various additional embodiments, other than (5×5) kernel sizes can similarly be used. In some embodiments, other suitable blur operations that differ from the above-indicated Gaussian blur operation can also be used.

Figure 8C:
FIGS. 8A-8C pictorially illustrate texture frames generated in the preprocessing block of the MPI encoder of FIG. 5 after applying texture-fill operations to the texture frames of FIGS. 7A-7C according to one example.
Figure 8B:
Figure 8A:

FIGS. 8A-8C pictorially illustrate RGB texture frames generated in the preprocessing block (510) of the MPI encoder (500) using the above-described texture-fill operations according to one example. The shown texture frames, labeled ($800_{12}$, $800_{17}$, $800_{20}$), correspond to the texture frames ($700_{12}$, $700_{17}$, $700_{20}$), respectively, of FIGS. 7A-7C. As evident from FIGS. 8A-8C, the above-described intra-image edges are substantially eliminated and there exists a relatively high level of correlation between the frames ($800_{12}$, $800_{17}$, $800_{20}$), which beneficially translates into better compressibility of the preprocessed texture-frame stream (512).

Note that, in an embodiment of the MPI encoder (500) configured to perform the above-described texture-fill operations, the source video bitstream (516) is not produced (is absent). As such, the corresponding coded bitstream (532) is generated in the MUX (530) by multiplexing only the bitstreams (522, 524, 528). At the MPI decoder (600), the decoded texture-frame stream (612) and the decoded alpha-frame stream (614) are sufficient for generating the MPI video (602) corresponding to a novel camera position (606).

According to another embodiment, the preprocessing block (510) is configured to leverage correlations between MPI layers of a multiplane image (200) and the corresponding source image captured at that RPC. For example, such correlations can be used to encode only important differences between the textures for each layer at every camera view. Corresponding preprocessing operations performed in the preprocessing block (510) may include: (i) for each MPI layer of a multiplane image (200), thresholding both the source camera image and the texture frame of that MPI layer based on the alpha frame of that MPI layer; and (ii) computing the difference between the thresholded source camera image and the thresholded texture frame of the MPI layer.

Example corresponding mathematical equations that can be used to implement those preprocessing operations in the preprocessing block (510) of the MPI encoder (500) are as follows:

$$S(i, j) = \begin{cases} 0, & A(i, j) <= \text{alpha\_threshold} \\ S(i), & A(i, j) > \text{alpha\_threshold} \end{cases} \quad (15)$$

$$\text{Color}(i, j) = \begin{cases} 0, & A(i, j) <= \text{alpha\_threshold} \\ RGB(i), & A(i, j) > \text{alpha\_threshold} \end{cases} \quad (16)$$

$$\text{Diff\_Texture}(i, j) = S(i, j) - \text{Color}(i, j) + 128 \quad (17)$$

$$\text{Diff\_Texture}(i, j) = \text{Clip}(\text{Diff\_Texture}(i, j), 0, 255) \quad (18)$$

where Eqs. (15) and (16) define the above-mentioned thresholding operations; and Eqs. (17) and (18) define the above-mentioned difference operations. The fixed threshold value (alpha_threshold) used in Eqs. (15) and (16) may be the same as or different from the fixed threshold value (alpha_threshold) used in Eq. (14), as Eqs. (15)-(16) and Eq. (14) represent different respective embodiments of texture preprocessing operations implemented in the preprocessing block (510). An offset value (=128) used in Eq. (17) is an example value corresponding to 8-bit SDR content. For 8-bit texture values, zero differences are coded as 128; all negative differences are coded into the interval between 0 & 127; and all positive differences are coded into the interval between 129 & 255. The maximum absolute difference that can be coded in this particular embodiment is 127 (8-bit), and any absolute difference larger than 127 gets clipped in the clipping operation represented by Eq. (18).

A person of ordinary skill in the pertinent art will understand that different offset values may be used with different dynamic ranges. Herein, the term "dynamic range" (DR) may relate to a capability of the human visual system (HVS) to perceive a range of intensity (e.g., luminance, luma) in an image, e.g., from darkest blacks (darks) to brightest whites (highlights). In this sense, DR relates to a "scene-referred" intensity. DR may also relate to the ability of a display device to render, adequately or approximately, an intensity range of a particular breadth. In this sense, DR relates to a "display-referred" intensity. Unless a particular sense is explicitly specified to have particular significance at any point in the description herein, it should be inferred that the term may be used in either sense, e.g., interchangeably.

As used herein, the term "high dynamic range" (HDR) relates to a DR breadth that spans 14-15 or more orders of magnitude of the HVS. In practice, the DR over which a human may simultaneously perceive an extensive breadth in intensity range may be somewhat truncated, in relation to HDR. As used herein, the terms "enhanced dynamic range" (EDR) or "visual dynamic range" (VDR) may individually or interchangeably relate to the DR that is perceivable within a scene or image by a human visual system that includes eye movements, allowing for some light adaptation changes across the scene or image. Herein, EDR may relate to a DR that spans 5 to 6 orders of magnitude. While perhaps somewhat narrower in relation to the true scene-referred HDR, EDR nonetheless represents a wide DR breadth and sometimes may also be referred to as HDR.

In practice, images comprise one or more color components (e.g., R, G, B) of a color space, where each color component is represented with a precision of n-bits per pixel (e.g., n=8). Using non-linear luminance coding (e.g., gamma encoding), images where n≤8 (e.g., 24-bit color JPEG images) are considered images of standard dynamic range (SDR), while images where n>8 may be considered images of EDR.

Figure 9C:
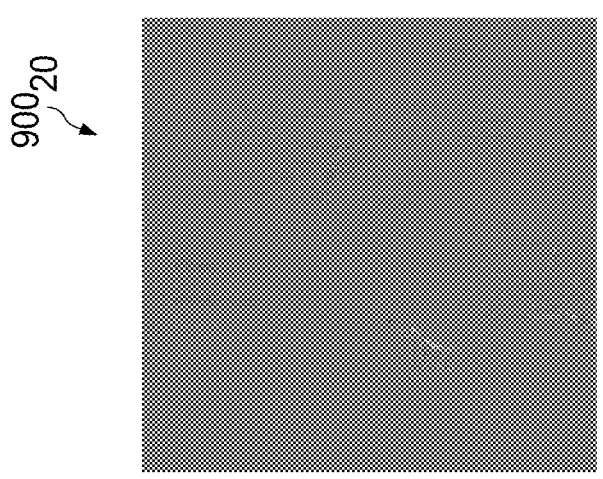
FIGS. 9A-9C pictorially illustrate texture frames generated in the preprocessing block of the MPI encoder of FIG. 5 after applying difference operations to the texture frames of FIGS. 7A-7C according to one example.
Figure 9B:
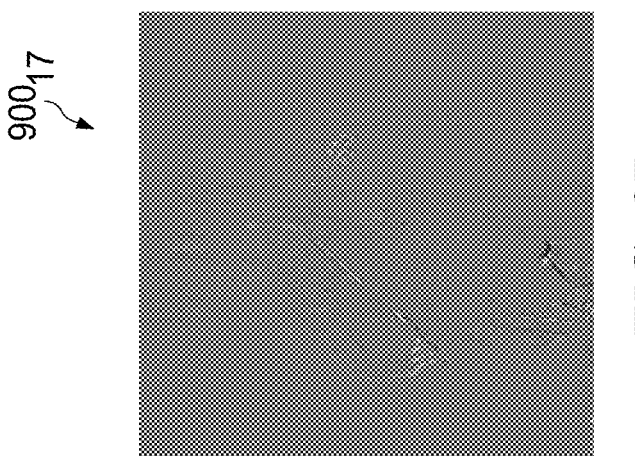
Figure 9A:
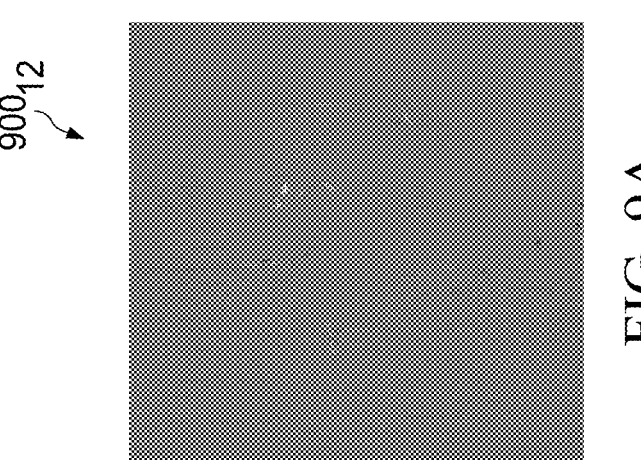

FIGS. 9A-9C pictorially illustrate RGB difference texture frames generated in the preprocessing block (510) of the MPI encoder (500) using the above-described difference operations according to one example. The shown texture frames, labeled ($900_{12}$, $900_{17}$, $900_{20}$), correspond to the texture frames ($700_{12}$, $700_{17}$, $700_{20}$), respectively, of FIGS. 7A-7C. As evident from FIGS. 9A-9C, the non-zero content in the frames ($900_{12}$, $900_{17}$, $900_{20}$) is sparse, which beneficially translates into better compressibility of the preprocessed texture-frame stream (512).

In some embodiments, to further reduce errors in RGB texture layer reconstruction at the MPI decoder (600), the MPI encoder (500) incorporates an encode-decode loop and is configured to use the decoded source image outputted by that loop to compute the S (i, j) with Eq. (15) and then to compute Diff_Texture(i, j) with Eq. (17).

Note that, in a representative embodiment of the MPI encoder (500) configured to perform the above-described difference operations, the source video bitstream (516) is encoded, and the resulting encoded bitstream (526) is transmitted to the MPI decoder (600) as indicated in FIGS. 5-6.

In contrast to RGB textures, the alpha data of a typical MPI video (502) show little (e.g., substantially none) native temporal correlation. In that sense, native alpha can be considered as substantially uncorrelated data distributed over various MPI layers. Accordingly, in some embodiments, to make the alpha data more compressible, the MPI encoder (500) is configured to introduce spatial and/or temporal correlation between alpha frames via a corresponding set of preprocessing operations performed in the preprocessing block (510). In one example, such set of preprocessing operations includes: (i) multiplying an alpha frame and the corresponding source image and (ii) normalizing the values of the resulting product frame to 8-bit. In some examples, such set of preprocessing operations also includes converting the RGB source image into a single-channel grayscale image. In some examples, such set of preprocessing operations also includes applying a Gaussian blur operation either to the RGB source image prior to the grayscale conversion or to the single-channel grayscale image produced by the grayscale conversion. The blur operation beneficially removes at least some of the high-frequency components from the preprocessed frame. In some examples, to reduce a floating-point error caused by division operations for which a small value is present in the denominator, the blurred source data may be clipped to be between a pre-determined float_error_threshold value a selected fixed maximum (e.g., 8-bit) value.

Example corresponding mathematical equations that can be used to configure the preprocessing block (510) of the MPI encoder (500) to generate the preprocessed alpha-frame stream (514) are as follows:

$$S(i, j) = \begin{cases} 0, & A(i, j) <= \text{alpha\_threshold} \\ S(i), & A(i, j) > \text{alpha\_threshold} \end{cases} \qquad (19)$$

$$SGray(i, j) = \text{RGB\_To\_Gray}(S(i, j)) \qquad (20)$$

$$BlurSGray(i, j) = GaussianBlur(SGray(i, j), 5 \times 5) \qquad (21)$$

$$BlurSGray(i, j) = Clip(BlurSGray(i, j), \text{float\_error\_threshold}, 255.0) \qquad (22)$$

$$PremultiplyA(i, j) = A(i, j) * BlurSGray(i, j) * \left(\frac{1}{255.0}\right) \qquad (23)$$

where Eq. (19) defines thresholding operations; Eq. (20) defines the above-mentioned grayscale conversion; Eq. (21) defines the above-mentioned Gaussian blur operations with a (5×5) pixel kernel; Eq. (22) defines the above-mentioned clipping operations; and Eq. (23) defines the above-mentioned frame-multiplication operation with 8-bit normalization. Note that Eq. (19) is the same as Eq. (15). As such the corresponding operations may be consolidated in at least some embodiments of the preprocessing block (510). The normalization and maximum values (=255) used in Eqs. (22), (23) correspond to 8-bit SDR content. Other suitable normalization and maximum values can be used for EDR or HDR content. In various additional embodiments, other than (5×5) kernel sizes can similarly be used. In some embodiments, other suitable blur operations that differ from the above-indicated Gaussian blur operation can also be used.

Figure 10C:
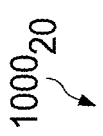
FIGS. 10A-10C pictorially illustrate preprocessed alpha frames generated in the preprocessing block of the MPI encoder of FIG. 5 according to one example.
Figure 10C:
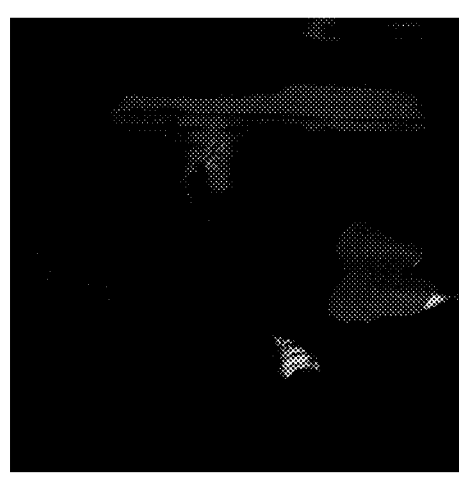
Figure 10B:
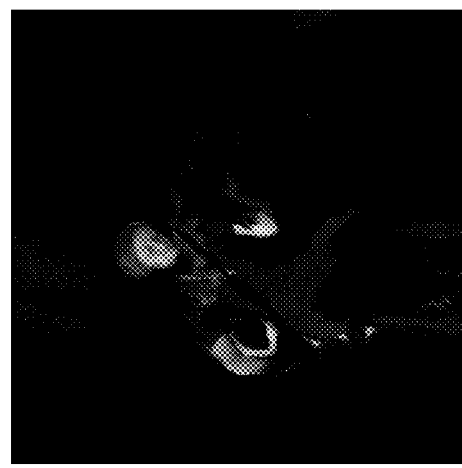
Figure 10A:
Figure 10A:

FIGS. 10A-10C pictorially illustrate preprocessed alpha frames generated in the preprocessing block (510) of the MPI encoder (500) using the above-described alpha-frame preprocessing operations according to one example. The shown preprocessed alpha frames, labeled ($1000_{12}$, $1000_{17}$, $1000_{20}$), correspond to the texture frames ($700_{12}$, $700_{17}$, $700_{20}$), respectively, of FIGS. 7A-7C. Beneficially, the preprocessed alpha frames ($1000_{12}$, $1000_{17}$, $1000_{20}$) exhibit better compression ratios in the video encoder (520) of the MPI encoder (500) than the corresponding original alpha frames (not explicitly shown).

Note that, in a representative embodiment of the MPI encoder (500) configured to perform the above-described alpha-frame preprocessing operations, the source video bitstream (516) is encoded, and the resulting encoded bitstream (526) is transmitted to the MPI decoder (600) as indicated in FIGS. 5-6. The MPI decoder (600) then uses the received source video bitstream (516) and the received encoded bitstream (526) to produce the decoded alpha-frame stream (614).

In some embodiments, the following additional operations may be implemented to the global quality of MPI images for the MPI video (602) and or compression ratios for the compressed video streams (522, 524, 526):

When applying the difference preprocessing operations described above, there is observed a minor loss of visible texture in some MPI examples. In some embodiments, this loss is compensated by coding the source video stream (516) with a lower Constant Rate Factor (CRF) (with a small overhead in bits). For example, with the source video stream (516) coded with CRF16 (as opposed to a default CRF28), back lower-level texture details can be more accurately represented in at least some examples.

By analyzing the deep-learning inferenced MPIs, it can be noticed that low-valued alphas may be sporadically spread across different MPI layers in some examples.

These low-valued alphas are predominantly erroneous in nature and do not meaningfully contribute to the visual quality of novel views for the output MPI video (602). Thus, in some configurations, the MPI encoder (500) may be configured to disregard such alpha values by enforcing a small non-zero empirically selected alpha threshold. Significant compression benefits were experimentally observed with such encoder configuration for at least some of such examples.

In some embodiments, configuring the MPI encoder (500) and the corresponding MPI decoder (600) to execute some or all of the above-described preprocessing/post-processing operations in a decorrelated color space, such as the YUV space, instead of the natively captured RGB space, provides added compression benefits with substantially no change in quality. The corresponding embodiments entail converting RGB MPIs into the YUV space, encoding, decoding, and reconverting back into RGB space before rendering. Herein, the term "YUV" refers to a family of color spaces, all of which encode brightness information separately from color information. An example of the YUV space is the YCbCr color space.

Example Hardware

Figure 11:
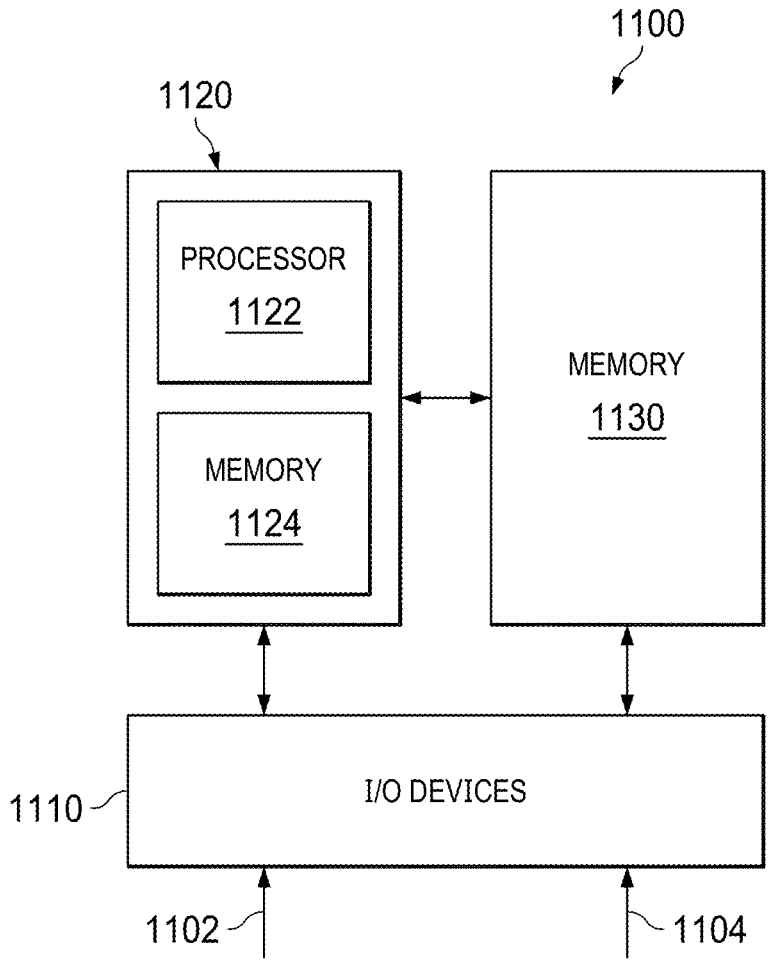
FIG. 11 is a block diagram illustrating a computing device used in the video/image delivery pipeline of FIG. 1 according to an embodiment.

FIG. 11 is a block diagram illustrating a computing device (1100) used in the video delivery pipeline (100) according to an embodiment. The device (1100) can be used, e.g., to implement the MPI encoder (500) or the MPI decoder (600). The computing device (1100) comprises input/output (I/O) devices (1110), a processing engine (1120), and a memory (1130). The I/O devices (1110) may be used to enable the device (1100) to receive various input signals (1102) and to output various output signals (1104). For example, the I/O devices (1110) may be operatively connected to send and receive signals via the communication channel used to transmit information between the MPI encoder (500) and the MPI decoder (600).

The memory (1130) may have buffers to receive data. Once the data are received, the memory (1130) may provide parts of the data to the processing engine (1120) for processing therein. The processing engine (1120) includes a processor (1122) and a memory (1124). The memory (1124) may store therein program code, which when executed by the processor (1122) enables the processing engine (1120) to perform various data processing operations, including but not limited to at least some operations of the above-described MPI methods.

According to an example embodiment disclosed above, e.g., in the summary section and/or in reference to any one or any combination of some or all of FIGS. 1-11, provided is an apparatus for compressing an MPI video, the apparatus comprising: at least one processor; and at least one memory including program code, wherein the at least one memory and the program code are configured to, with the at least one processor, cause the apparatus at least to: split the MPI video into a first frame sequence and a second frame sequence, the first frame sequence being a sequence of texture frames, with each of the texture frames representing a respective layer of a corresponding multiplane image of the MPI video, the second frame sequence being a sequence of alpha frames, with each of the alpha frames corresponding to a respective one of the texture frames of the first sequence; apply a first set of preprocessing operations to convert the first frame sequence into a third frame sequence, the first set including operations according to which a pixel value in a frame of the third frame sequence is determined based on a comparison of a corresponding pixel value of the corresponding alpha frame of the second frame sequence with a first threshold value; apply a second set of preprocessing operations to convert the second frame sequence into a fourth frame sequence, the second set including operations according to which a pixel value in a frame of the fourth frame sequence is determined based on a comparison of a corresponding pixel value of a corresponding source image with a second threshold value; and apply video compression to the second frame sequence and to the fourth frame sequence.

According to another example embodiment disclosed above, e.g., in the summary section and/or in reference to any one or any combination of some or all of FIGS. 1-11, provided is a method of compressing an MPI video, the method comprising: splitting the MPI video into a first frame sequence and a second frame sequence, the first frame sequence being a sequence of texture frames, with each of the texture frames representing a respective layer of a corresponding multiplane image of the MPI video, the second frame sequence being a sequence of alpha frames, with each of the alpha frames corresponding to a respective one of the texture frames of the first sequence; applying a first set of preprocessing operations to convert the first frame sequence into a third frame sequence, the first set including operations according to which a pixel value in a frame of the third frame sequence is determined based on a comparison of a corresponding pixel value of the corresponding alpha frame of the second frame sequence with a first threshold value; applying a second set of preprocessing operations to convert the second frame sequence into a fourth frame sequence, the second set including operations according to which a pixel value in a frame of the fourth frame sequence is determined based on a comparison of a corresponding pixel value of a corresponding source image with a second threshold value; and applying video compression to the second frame sequence and to the fourth frame sequence.

In some embodiments of the above method, the method further comprises applying video compression to a sequence of source images corresponding to the MPI video.

In some embodiments of any of the above methods, the method further comprises generating a metadata stream signaling parameters of the video compression; generating an output bitstream by multiplexing the compressed third frame sequence, the compressed fourth frame sequence, the compressed sequence of source images, and the metadata stream; and transmitting the output bitstream through a communication channel.

In some embodiments of any of the above methods, the first set comprises: generating a corresponding blurred image by applying a blur transformation to the corresponding source image; and when the corresponding pixel value of the corresponding alpha frame of the second frame sequence is smaller than the first threshold value, assigning a corresponding pixel value from the corresponding blurred image to be the pixel value in the frame of the third frame sequence.

In some embodiments of any of the above methods, the first set further comprises: when the corresponding pixel value of the corresponding alpha frame of the second frame sequence is greater than the first threshold value, transferring a corresponding pixel value from the first frame sequence to the third frame sequence.

In some embodiments of any of the above methods, the blur transformation is a Gaussian blur transformation with a square kernel including more than one pixel.

In some embodiments of any of the above methods, the first set comprises generating a first thresholded image by nulling in the corresponding source image all pixel values for which the corresponding pixel value of the corresponding alpha frame of the second frame sequence is smaller than the first threshold value.

In some embodiments of any of the above methods, the first set further comprises generating a second thresholded image by nulling in a corresponding texture frame of the first sequence all pixel values for which the corresponding pixel value of the corresponding alpha frame of the second frame sequence is smaller than the first threshold value.

In some embodiments of any of the above methods, the first set further comprises: computing pixelwise difference values between the first thresholded image and the second thresholded image; and computing a corresponding frame for the third frame sequence by adding a fixed offset value to the computed pixelwise difference values, wherein the fixed offset value is selected based on an image resolution.

In some embodiments of any of the above methods, the second set comprises generating a first thresholded image by nulling in the corresponding source image all pixel values for which the corresponding pixel value of the corresponding alpha frame of the second frame sequence is smaller than the second threshold value.

In some embodiments of any of the above methods, the second set further comprises converting the first thresholded image into a corresponding grayscale image.

In some embodiments of any of the above methods, the second set further comprises generating a corresponding blurred image by applying a blur transformation to the corresponding grayscale image.

In some embodiments of any of the above methods, the second set further comprises: computing pixelwise product values using the first thresholded image and the corresponding blurred image; and computing a corresponding frame for the third frame sequence by applying normalization and clipping operations to the computed pixelwise product values, wherein the normalization and clipping operations are configured based on an image resolution.

In some embodiments of any of the above methods, the MPI video is one of a plurality of MPI videos corresponding to different respective camera positions of a plurality of camera positions arranged around a scene captured in the MPI video.

According to yet another example embodiment disclosed above, e.g., in the summary section and/or in reference to any one or any combination of some or all of FIGS. 1-11, provided is a non-transitory computer-readable medium storing instructions that, when executed by an electronic processor, cause the electronic processor to perform operations comprising any one of the above methods of compressing an MPI video.

According to yet another example embodiment disclosed above, e.g., in the summary section and/or in reference to any one or any combination of some or all of FIGS. 1-11, provided is a method of rendering an MPI video, the method comprising: receiving (i) a first compressed frame sequence having encoded therein a sequence of texture frames, with each of the texture frames representing a respective layer of a corresponding multiplane image of the MPI video, (ii) a second compressed frame sequence having encoded therein a sequence of alpha frames, with each of the alpha frames corresponding to a respective one of the texture frames, and (iii) a compressed sequence of source images; applying video decompression to the first compressed frame sequence, the second compressed frame sequence, and the compressed sequence of source images to generate a first uncompressed frame sequence, a second uncompressed frame sequence, and an uncompressed sequence of source images; applying a first set of postprocessing operations to the first uncompressed frame sequence to recover the sequence of texture frames; applying a second set of postprocessing operations to the second uncompressed frame sequence to recover the sequence of alpha frames; and combining corresponding pairs of frames from the recovered sequence of texture frames and the recovered sequence of alpha frames to generate a sequence of four-channel frames, with each of the four-channel frames representing a respective layer of a corresponding multiplane image of the MPI video, wherein at least one of the first set of postprocessing operations and the second set of postprocessing operations includes one or more operations using the uncompressed sequence of source images.

In some embodiments of the above method, the method further comprises generating a viewable video corresponding to a novel camera position based on the sequence of four-channel frames.

In some embodiments of any of the above methods, the MPI video is one of a plurality of MPI videos corresponding to different respective camera positions of a plurality of camera positions arranged around a scene captured in the MPI video.

According to yet another example embodiment disclosed above, e.g., in the summary section and/or in reference to any one or any combination of some or all of FIGS. 1-11, provided is a non-transitory computer-readable medium storing instructions that, when executed by an electronic processor, cause the electronic processor to perform operations comprising any one of the above methods of rendering an MPI video.

According to yet another example embodiment disclosed above, e.g., in the summary section and/or in reference to any one or any combination of some or all of FIGS. 1-11, provided is an apparatus for rendering an MPI video, the apparatus comprising: at least one processor; and at least one memory including program code, wherein the at least one memory and the program code are configured to, with the at least one processor, cause the apparatus at least to: receive (i) a first compressed frame sequence having encoded therein a sequence of texture frames, with each of the texture frames representing a respective layer of a corresponding multiplane image of the MPI video, (ii) a second compressed frame sequence having encoded therein a sequence of alpha frames, with each of the alpha frames corresponding to a respective one of the texture frames, and (iii) a compressed sequence of source images; apply video decompression to the first compressed frame sequence, the second compressed frame sequence, and the compressed sequence of source images to generate a first uncompressed frame sequence, a second uncompressed frame sequence, and an uncompressed sequence of source images; apply a first set of postprocessing operations to the first uncompressed frame sequence to recover the sequence of texture frames; apply a second set of postprocessing operations to the second uncompressed frame sequence to recover the sequence of alpha frames; and combine corresponding pairs of frames from the recovered sequence of texture frames and the recovered sequence of alpha frames to generate a sequence of four-channel frames, with each of the four-channel frames representing a respective layer of a corresponding multiplane image of the MPI video, wherein at least one of the first set of postprocessing operations and the second set of postprocessing operations includes one or more operations using the uncompressed sequence of source images.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments incorporate more features than are expressly recited in each claim. Rather, as the following claims reflect, inventive subject matter lies in fewer than all features of a single disclosed embodiment. Thus, the following claims are hereby incorporated into the Detailed Description, with each claim standing on its own as a separately claimed subject matter.

While this disclosure includes references to illustrative embodiments, this specification is not intended to be construed in a limiting sense. Various modifications of the described embodiments, as well as other embodiments within the scope of the disclosure, which are apparent to persons skilled in the art to which the disclosure pertains are deemed to lie within the principle and scope of the disclosure, e.g., as expressed in the following claims.

Some embodiments may be implemented as circuit-based processes, including possible implementation on a single integrated circuit.

Some embodiments can be embodied in the form of methods and apparatuses for practicing those methods. Some embodiments can also be embodied in the form of program code recorded in tangible media, such as magnetic recording media, optical recording media, solid state memory, floppy diskettes, CD-ROMs, hard drives, or any other non-transitory machine-readable storage medium, wherein, when the program code is loaded into and executed by a machine, such as a computer, the machine becomes an apparatus for practicing the patented invention(s). Some embodiments can also be embodied in the form of program code, for example, stored in a non-transitory machine-readable storage medium including being loaded into and/or executed by a machine, wherein, when the program code is loaded into and executed by a machine, such as a computer or a processor, the machine becomes an apparatus for practicing the patented invention(s). When implemented on a general-purpose processor, the program code segments combine with the processor to provide a unique device that operates analogously to specific logic circuits.

Unless explicitly stated otherwise, each numerical value and range should be interpreted as being approximate as if the word "about" or "approximately" preceded the value or range.

The use of figure numbers and/or figure reference labels in the claims is intended to identify one or more possible embodiments of the claimed subject matter in order to facilitate the interpretation of the claims. Such use is not to be construed as necessarily limiting the scope of those claims to the embodiments shown in the corresponding figures.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

Reference herein to "one embodiment" or "an embodiment" means that a particular feature, structure, or characteristic described in connection with the embodiment can be included in at least one embodiment of the disclosure. The appearances of the phrase "in one embodiment" in various places in the specification are not necessarily all referring to the same embodiment, nor are separate or alternative embodiments necessarily mutually exclusive of other embodiments. The same applies to the term "implementation."

Unless otherwise specified herein, the use of the ordinal adjectives "first," "second," "third," etc., to refer to an object of a plurality of like objects merely indicates that different instances of such like objects are being referred to, and is not intended to imply that the like objects so referred-to have to be in a corresponding order or sequence, either temporally, spatially, in ranking, or in any other manner.

Unless otherwise specified herein, in addition to its plain meaning, the conjunction "if" may also or alternatively be construed to mean "when" or "upon" or "in response to determining" or "in response to detecting," which construal may depend on the corresponding specific context. For example, the phrase "if it is determined" or "if [a stated condition] is detected" may be construed to mean "upon determining" or "in response to determining" or "upon detecting [the stated condition or event]" or "in response to detecting [the stated condition or event]."

Also, for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

As used herein in reference to an element and a standard, the term compatible means that the element communicates with other elements in a manner wholly or partially specified by the standard and would be recognized by other elements as sufficiently capable of communicating with the other elements in the manner specified by the standard. The compatible element does not need to operate internally in a manner specified by the standard.

The functions of the various elements shown in the figures, including any functional blocks labeled as "processors" and/or "controllers," may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and nonvolatile storage. Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

As used in this application, the terms "circuit," "circuitry" may refer to one or more or all of the following: (a) hardware-only circuit implementations (such as implementations in only analog and/or digital circuitry); (b) combinations of hardware circuits and software, such as (as applicable): (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions); and (c) hardware circuit(s) and or processor(s), such as a microprocessor(s) or a portion of a microprocessor(s), that requires software (e.g., firmware) for operation, but the software may not be present when it is not needed for operation." This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

It should be appreciated by those of ordinary skill in the art that any block diagrams herein represent conceptual views of illustrative circuitry embodying the principles of the disclosure. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

"BRIEF SUMMARY OF SOME SPECIFIC EMBODI-MENTS" in this specification is intended to introduce some example embodiments, with additional embodiments being described in "DETAILED DESCRIPTION" and/or in reference to one or more drawings. "BRIEF SUMMARY OF SOME SPECIFIC EMBODIMENTS" is not intended to identify essential elements or features of the claimed subject matter, nor is it intended to limit the scope of the claimed subject matter.

What is claimed is:

1. A method of compressing a multiplane-image (MPI) video, the method comprising:

splitting the MPI video into a first frame sequence and a second frame sequence, the first frame sequence being a sequence of texture frames, with each of the texture frames representing a respective layer of a corresponding multiplane image of the MPI video, the second frame sequence being a sequence of alpha frames, with each of the alpha frames corresponding to a respective one of the texture frames of the first sequence;

applying a first set of preprocessing operations to convert the first frame sequence into a third frame sequence, the first set comprising:

a) generating a corresponding blurred image by applying a blur transformation to the corresponding source image; and when the corresponding pixel value of the corresponding alpha frame of the second frame sequence is smaller than a first threshold value, assigning a corresponding pixel value from the corresponding blurred image to be the pixel value in the frame of the third frame sequence; or b) generating a first thresholded image by nulling in the corresponding source image all pixel values for which the corresponding pixel value of the corresponding alpha frame of the second frame sequence is smaller than the first threshold value; and generating a second thresholded image by nulling in a corresponding texture frame of the first sequence all pixel values for which the corresponding pixel value of the corresponding alpha frame of the second frame sequence is smaller than the first threshold value;

applying a second set of preprocessing operations to convert the second frame sequence into a fourth frame sequence, the second set including operations according to which a pixel value in a frame of the fourth frame sequence is determined based on a comparison of a corresponding pixel value of a corresponding source image with a second threshold value; and applying video compression to the second frame sequence and to the fourth frame sequence.

2. The method of claim 1, further comprising applying video compression to a sequence of source images corresponding to the MPI video.

3. The method of claim 2, further comprising:

generating a metadata stream signaling parameters of the video compression;

generating an output bitstream by multiplexing the compressed third frame sequence, the compressed fourth frame sequence, the compressed sequence of source images, and the metadata stream; and transmitting the output bitstream through a communication channel.

4. The method of claim 1, wherein option a) of the first set further comprises:

when the corresponding pixel value of the corresponding alpha frame of the second frame sequence is greater than the first threshold value, transferring a corresponding pixel value from the first frame sequence to the third frame sequence.

5. The method of claim 1, wherein the blur transformation is a Gaussian blur transformation with a square kernel including more than one pixel.

6. The method of claim 1, wherein option b) of the first set further comprises:

computing pixelwise difference values between the first thresholded image and the second thresholded image; and computing a corresponding frame for the third frame sequence by adding a fixed offset value to the computed pixelwise difference values, wherein the fixed offset value is selected based on an image resolution.

7. The method of claim 1, wherein the second set comprises generating a first thresholded image by nulling in the corresponding source image all pixel values for which the corresponding pixel value of the corresponding alpha frame of the second frame sequence is smaller than the second threshold value.

8. The method of claim 7, wherein the second set further comprises converting the first thresholded image into a corresponding grayscale image.

9. The method of claim 8, wherein the second set further comprises generating a corresponding blurred image by applying a blur transformation to the corresponding grayscale image.

10. The method of claim 9, wherein the second set further comprises:

computing pixelwise product values using the first thresholded image and the corresponding blurred image; and computing a corresponding frame for the third frame sequence by applying normalization and clipping operations to the computed pixelwise product values, wherein the normalization and clipping operations are configured based on an image resolution.

11. The method of claim 1, wherein the MPI video is one of a plurality of MPI videos corresponding to different respective camera positions of a plurality of camera positions arranged around a scene captured in the MPI video.

12. A non-transitory computer-readable medium storing instructions that, when executed by an electronic processor, cause the electronic processor to perform operations comprising the method of claim 1.

13. An apparatus for compressing a multiplane-image (MPI) video, the apparatus comprising:

at least one processor; and at least one memory including program code, wherein the at least one memory and the program code are configured to, with the at least one processor, to perform the method of claim 1.

14. The method of claim 3, further comprising:

receiving the output bitstream;

parsing the metadata stream signaling parameters;

decompressing the compressed third frame sequence, the compressed fourth frame sequence, and the compressed sequence of source images; and generating a multiplane-image (MPI) video using the metadata stream signaling parameters, the decompressed third frame sequence, the decompressed fourth frame sequence, and the decompressed sequence of source images.

15. The method of claim 14, wherein the MPI video is one of a plurality of MPI videos corresponding to different respective camera positions of a plurality of camera positions arranged around a scene captured in the MPI video.

16. A non-transitory computer-readable medium storing instructions that, when executed by an electronic processor, cause the electronic processor to perform operations comprising the method of claim 14.

\* \* \* \* \*